(12) United States Patent
Orshansky (10) Patent No.: US 8,938,069 B2
(45) Date of Patent: Jan. 20, 2015

(54) PHYSICALLY UNCLONABLE FUNCTIONS BASED ON NON-LINEARITY OF SUB-THRESHOLD OPERATION

(71) Applicant: Board of Regents, The University of Texas System, Austin, TX (US)

(72) Inventor: Michael Orshansky, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 57 days.

(21) Appl. No.: 13/908,348

(22) Filed: Jun. 3, 2013

(65) Prior Publication Data

US 2013/0322617 A1 Dec. 5, 2013

Related U.S. Application Data

(60) Provisional application No. 61/655,689, filed on Jun. 5, 2012.

(51) Int. Cl.
*H04L 29/06* (2006.01)
*H04L 9/32* (2006.01)
(Continued)

(52) U.S. Cl.
CPC ............... *H04L 9/3278* (2013.01); *H04L 9/18* (2013.01); *H04L 9/06* (2013.01); *H04L 9/00* (2013.01); *H04L 9/08* (2013.01)
USPC ............................................... 380/28; 380/44

(58) Field of Classification Search
CPC ........... H04L 9/3278; H04L 9/06; H04L 9/00; H04L 9/30; H04L 9/18; G06F 7/725
USPC ......................................................... 380/28
See application file for complete search history.

(56) References Cited

U.S. PATENT DOCUMENTS

| 7,564,345 B2 | 7/2009 | Devadas et al. |
| 7,702,927 B2 | 4/2010 | Devadas et al. |

(Continued)

FOREIGN PATENT DOCUMENTS

| WO | 2012045627 A1 | 4/2012 |
| WO | 2012069545 A2 | 5/2012 |

OTHER PUBLICATIONS

G. Edward Suh and Srinivas Devadas. "Physical Unclonable Functions for Device Authentication and Key Generation." Proceedings of the 44th Annual Design Automation Conference (DAC '07), pp. 9-14, ACM New York, USA [2007].*

(Continued)

*Primary Examiner* — Taghi Arani
*Assistant Examiner* — Narciso Victoria
(74) *Attorney, Agent, or Firm* — Robert A. Voigt, Jr.; Winstead, P.C.

(57) ABSTRACT

An electronic circuit for implementing a physically unclonable function. The electronic circuit includes duplicate circuits, referred to as "circuit primitives," that generate a first and a second output voltage based on the received input, referred to as a "challenge." The electronic circuit further includes a comparator coupled to the circuit primitives and generates an output based on the difference between the first and second output voltages. While the circuit primitives contain duplicate circuitry, the circuit primitives may generate a different output voltage due to a particular set of transistors in the circuit primitives operating in the sub-threshold region whose gates are tied to ground and whose sub-threshold current, the magnitude of which is random based on the threshold voltage variation of the set of transistors, is used to affect the value of the output voltage.

9 Claims, 4 Drawing Sheets

(51) Int. Cl.
*H04L 9/18* (2006.01)
*H04L 9/06* (2006.01)
*H04L 9/00* (2006.01)
*H04L 9/08* (2006.01)

(56) References Cited

U.S. PATENT DOCUMENTS

| | | | |
|---|---|---|---|
| 7,839,278 B2 | 11/2010 | Devadas et al. | |
| 8,415,969 B1 * | 4/2013 | Ficke et al. | 326/8 |
| 8,619,979 B2 * | 12/2013 | Ficke et al. | 380/44 |
| 8,700,916 B2 * | 4/2014 | Bell et al. | 713/189 |
| 8,750,502 B2 * | 6/2014 | Kirkpatrick et al. | 380/44 |
| 2011/0317829 A1 | 12/2011 | Ficke et al. | |

OTHER PUBLICATIONS

Mukund Kalyanaraman, "Highly Secure Strong PUF Based on Nonlinearity of MOSFET Subthreshold Operation," Thesis, Presented to the Faculty of the Graduate School of The University of Texas at Austin, Dec. 2012.

Gassend et al., "Silicon Physical Random Functions," ACM Conference on Computer and Communications Security, pp. 148-160, Nov. 18-22, 2002.

Ruhrmair et al., "Modeling Attacks on Physical Unclonable Functions," Conference on Computer and Communications Security, Oct. 4-8, 2010.

Majzoobi et al., "Testing Techniques for Hardware Security," 2008 IEEE International Test Conference, pp. 1-10, Oct. 2008.

Gassend et al., "Controlled Physical Random Functions," 18th Annual Computer Security Applications Conference, 2002.

Majzoobi et al., "Lightweight Secure PUFs," IEEE/ACM International Conference on Computer-Aided Design, (ICCAD), pp. 670-673, Nov. 10-13, 2008.

Guajardo et al., "FPGA Intrinsic PUFs and Their Use for IP Protection," Cryptographic Hardware and Embedded Systems Workshop, vol. 4727 of LNCS, pp. 63-80, Sep. 2007.

Holcomb et al., "Initial SRAM State as a Fingerprint and Source of True Random Numbers for RFID Tags," Proceedings of the Conference on RFID Security, Jul. 2007.

International Search Report and Written Opinion for International Application No. PCT/US13/43864 dated Oct. 8, 2013, pp. 1-7.

* cited by examiner

PHYSICALLY UNCLONABLE FUNCTIONS BASED ON NON-LINEARITY OF SUB-THRESHOLD OPERATION

CROSS-REFERENCE TO RELATED APPLICATIONS

This application is related to the following commonly owned U.S. Patent Application:

Provisional Application Ser. No. 61/655,689, "Physically Unclonable Functions Based on Non-Linearity of Sub-Threshold Operation and Drain-Induced Barrier Lowering Effect," filed Jun. 5, 2012, and claims the benefit of its earlier filing date under 35 U.S.C. §119(e).

TECHNICAL FIELD

The present invention relates generally to physically unclonable functions, and more particularly to highly secure strong Physically Unclonable Functions (PUFs) based on the strong non-linearity of the Field-Effect Transistor (FET) operation in the sub-threshold region and the Drain-Induced Barrier Lowering (DIBL) effect.

BACKGROUND

A Physically Unclonable Function (PUF) exploits variations, such as stochastic process variations in manufacturing, to generate secret keys used in cryptographic operations, chip authentication, and even random number generation. A device that supports a PUF yields different responses (e.g., binary responses) to different inputs, referred to as "challenges." Authentication of a device using a PUF is performed by supplying a challenge input to the device to which the response of an authentic device is known. The response is a result of a function that, by definition, is not clonable. For example, a PUF may result from stochastic process variations in the production of otherwise identical devices. As a result of the process variations, the otherwise identical devices may respond with a different series of bits in response to a set of challenge input bits.

Currently, the most widely adopted silicon-based PUFs are based on establishing timing races and relying on arbiters to produce a rich set of responses. The PUF circuit can use random variations in the delay of circuit components to achieve an unpredictable mapping of challenges and responses. For example, given an input challenge, a race condition is set up in the circuit, and two transitions that propagate along different paths are compared to see which comes first. An arbiter, typically implemented as a latch, produces a logical "1" or a "0", depending on which transition comes first. When a circuit with the same layout mask is fabricated to result in different chips, the mapping between challenges and responses implemented by the circuit is different for each chip due to the random variations of delays.

Unfortunately, such PUFs show a vulnerability to machine-learning attacks due to the linear separability of the output function as a result of the additive nature of the timing delay along the paths.

BRIEF SUMMARY

In one embodiment of the present invention, an electronic circuit for implementing a Physically Unclonable Function (PUF) comprises a first and a second circuit primitive configured to generate a first and a second output voltage, respectively, where the first and second circuit primitives are duplicates of one another. The electronic circuit further comprises a challenge inputted to the first and second circuit primitives. Furthermore, the electronic circuit comprises a comparator coupled to the first and second circuit primitives, where the comparator generates an output based on a difference between the first and second output voltages. Each of the first and second circuit primitives comprises one or more circuit blocks. Each of the one or more circuit blocks comprises a first plurality of series-connected transistors that operate in a sub-threshold region, where a gate of each of the first plurality of series-connected transistors is tied to ground or to an internal node and where a drain of a first transistor of the first plurality of series-connected transistors is coupled to an output node. Furthermore, each of the one or more circuit blocks comprises a second plurality of transistors that are in parallel to the first plurality of series-connected transistors, where a drain of a first transistor of the second plurality of transistors is coupled to the output node and where a gate of each of the second plurality of transistors receives a value of one bit of the challenge. Furthermore, the electronic circuit comprises a first transistor coupled to a source of a second transistor of the first plurality of series-connected transistors and coupled to a source of a second transistor of the second plurality of transistors in response to having two or more circuit blocks, where the first transistor is controlled by an input that corresponds to a logical operation of each value for each bit of the challenge. Each of the first and second output voltages of the first and second circuit primitives, respectively, is determined based on current that flows through the first plurality of series-connected transistors of the first and second circuit primitives, respectively, whose magnitude is random based on a threshold voltage variation of the first plurality of series-connected transistors.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As stated in the Background section, currently, the most widely adopted strong silicon-based PUFs (those with a large number of challenge-response pairs) are based on establishing timing races and relying on arbiters to produce a rich set of responses. The PUF circuit can use random variations in the delay of circuit components to achieve an unpredictable mapping of challenges and responses. For example, given an input challenge, a race condition is set up in the circuit, and two transitions that propagate along different paths are compared to see which comes first. An arbiter, typically implemented as a latch, produces a logical "1" or a "0", depending on which transition comes first. When a circuit with the same layout mask is fabricated, and the result of fabrication is a set of different chips, the input-output mapping implemented by the circuit is different for each chip due to the random variations of delays. Unfortunately, such PUFs show a vulnerability to machine-learning attacks due to the linear separability of the output function as a result of the additive nature of the timing delay along the paths.

The principles of the present invention provide a PUF that is less vulnerable to machine-learning attacks by relying on the non-linearity of the responses produced by the physics of the Field-Effect Transistors (FETs) at the nanometer scale. Namely, the strong non-linear behavior of the FET in the sub-threshold region of its operation and also the Drain-Induced Barrier Lowering (DIBL) effect are used to inject strong non-linearity into the response of the PUF. Non-linearity is based on the fact that in the sub-threshold region of FET operation, current is an exponential function of threshold voltages which exhibit strong random intrinsic variability. An additional non-linearity is due to exponential dependence of current on drain-to-source voltage due to DIBL. DIBL refers to the reduction of threshold voltage of the transistor at higher drain voltages. The generated voltages from the duplicate circuit primitives of the electronic circuit implementing a PUF are compared to produce a random binary response as discussed below in connection with FIGS. 1-4.

Figure 1:
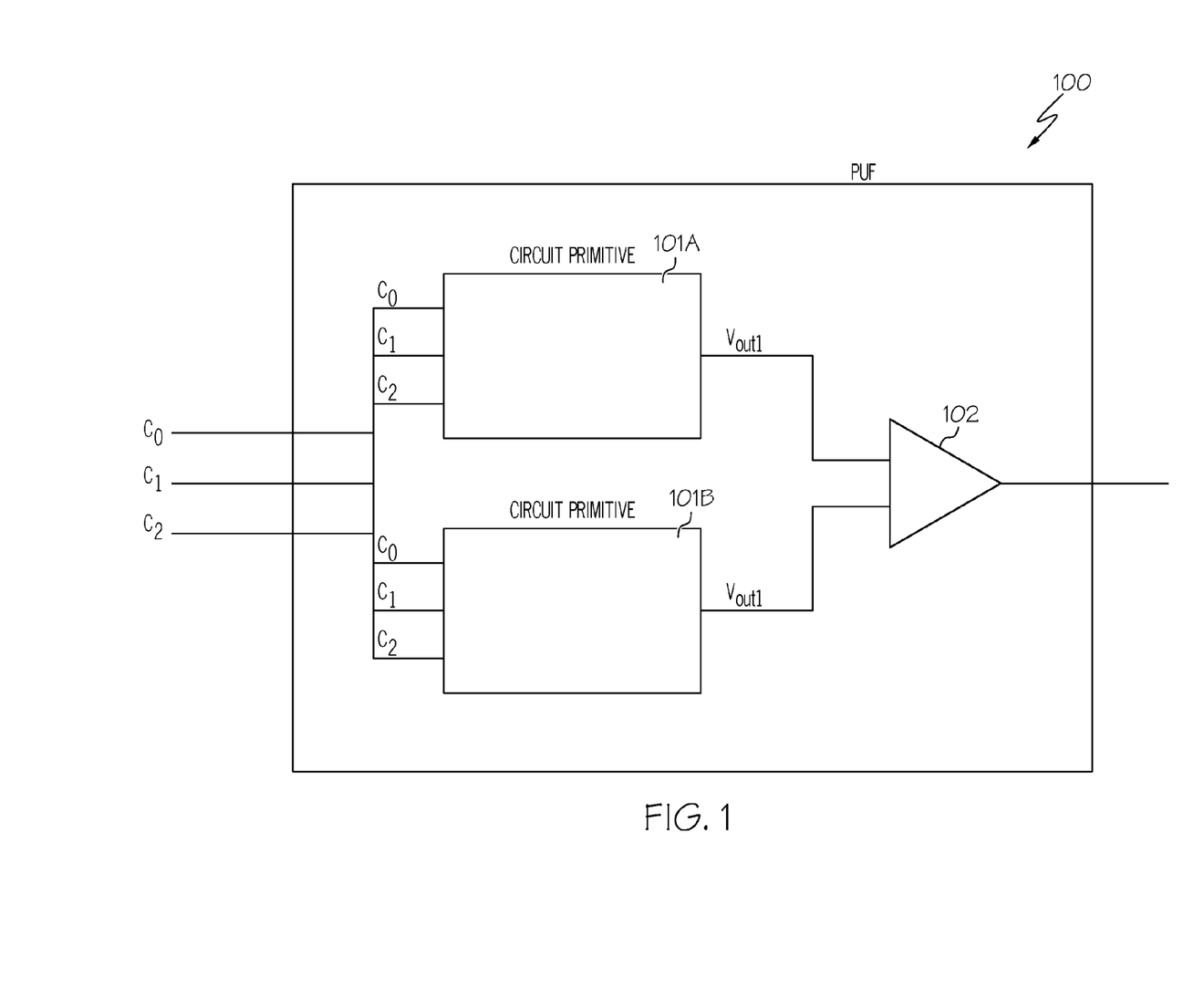
FIG. 1 illustrates an electronic circuit implementing a Physically Unclonable Function (PUF) for generating non-linear responses produced by the physics of the Field-Effect Transistors (FETs) of the duplicate circuit primitives at the nanometer scale in accordance with an embodiment of the present invention.
Figure 2:
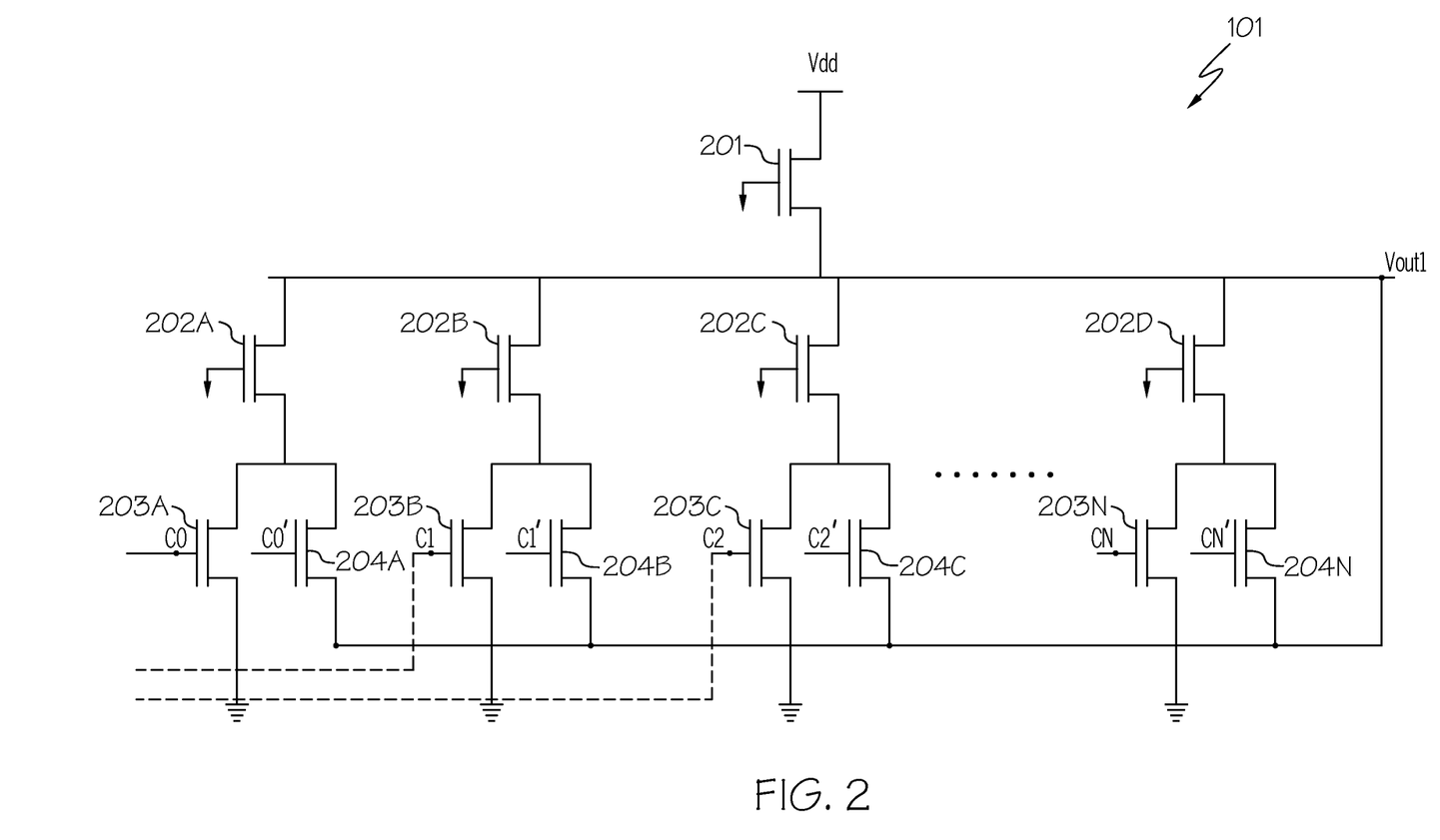
FIG. 2 illustrates one embodiment of the circuit primitive that is used in the electronic circuit depicted in FIG. 1.
Figure 3:
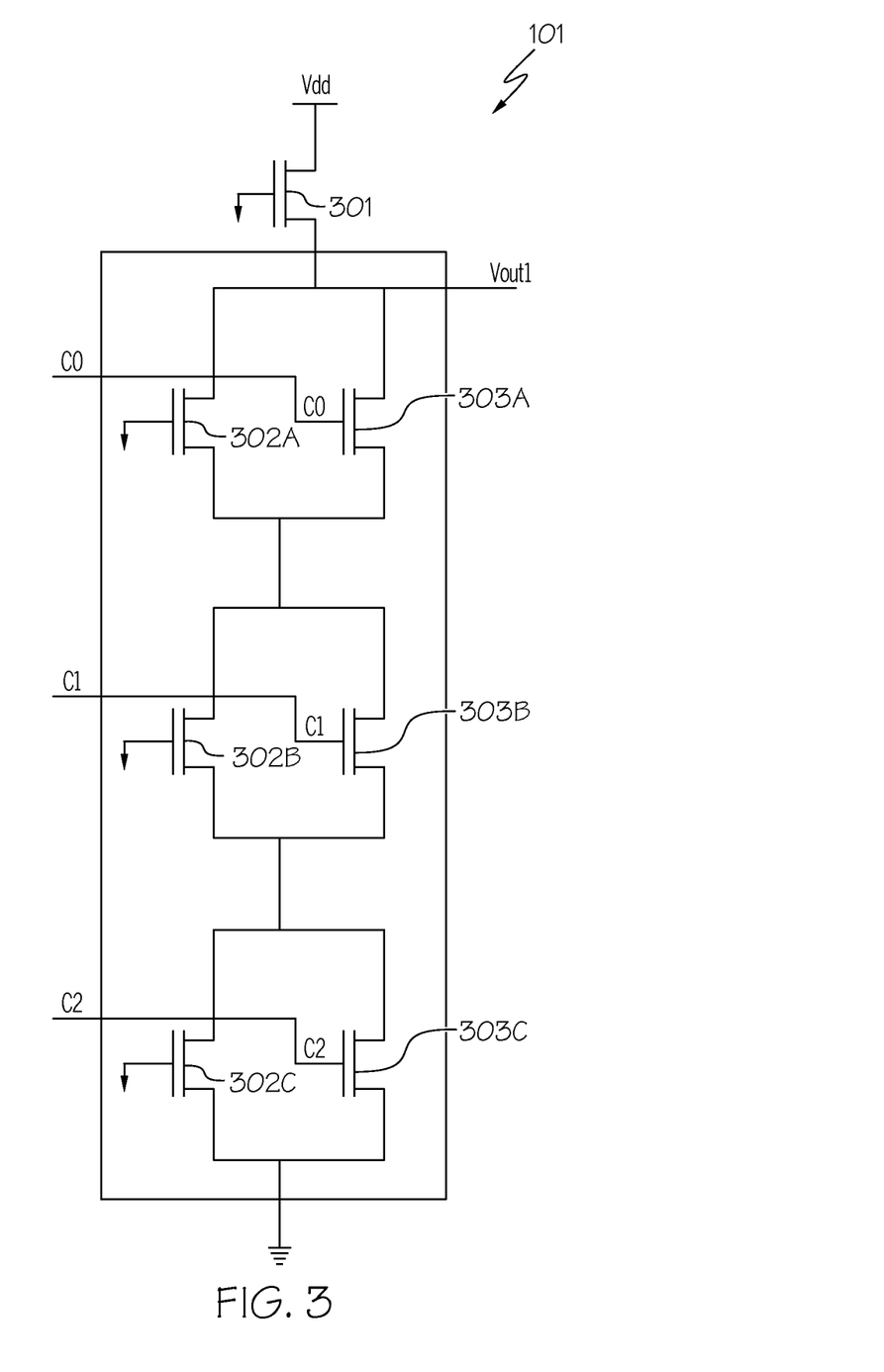
FIG. 3 illustrates an alternative embodiment of the circuit primitive that is used in the electronic circuit depicted in FIG. 1.
Figure 4:
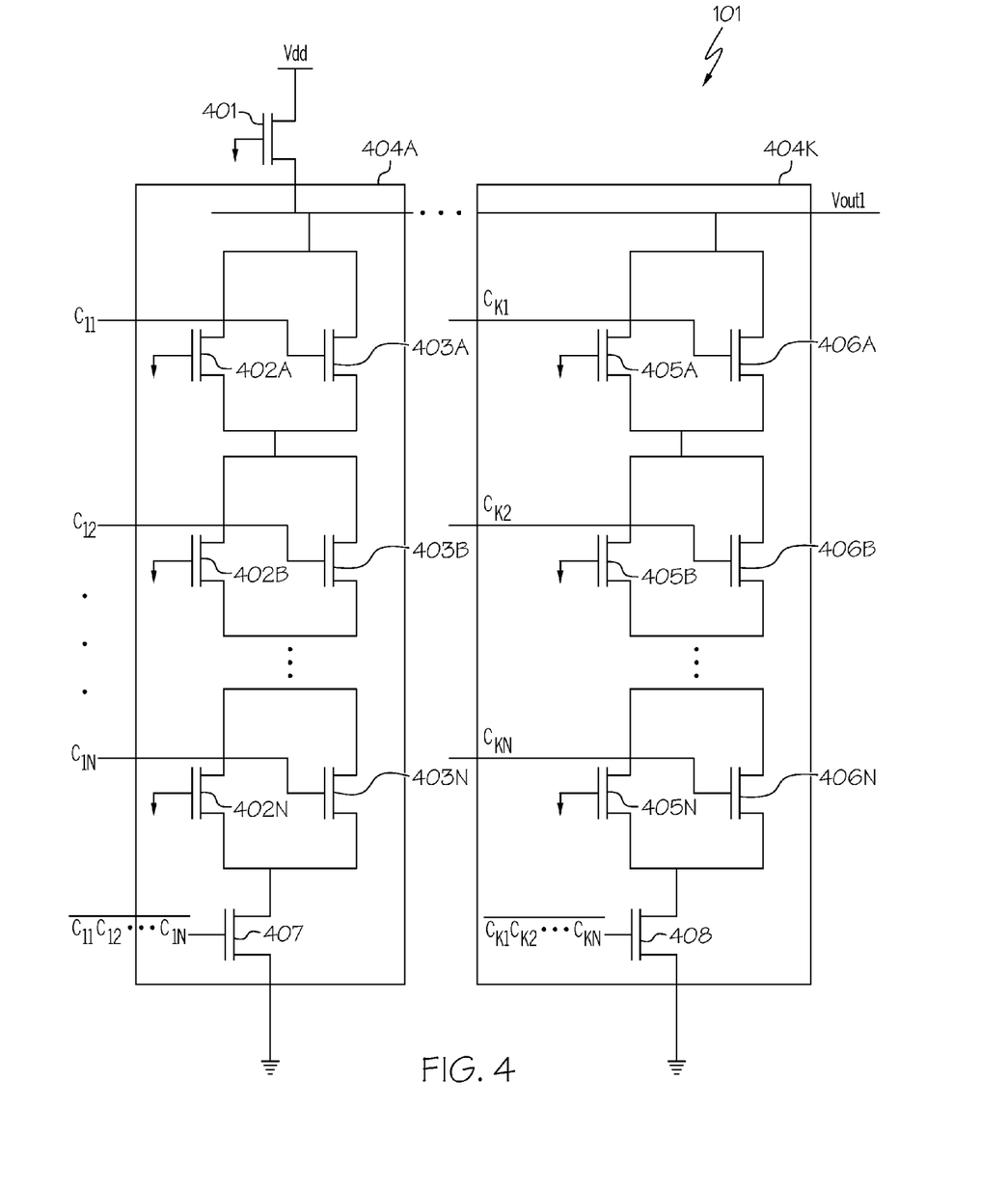
FIG. 4 illustrates a further alternative embodiment of the circuit primitive that is used in the electronic circuit depicted in FIG. 1.

FIG. 1 illustrates an electronic circuit implementing a PUF for generating non-linear responses produced by the physics of the FETs of the duplicate circuit primitives at the nanometer scale. FIG. 2 illustrates one embodiment of the circuit primitive that is used in the electronic circuit depicted in FIG. 1. FIG. 3 illustrates an alternative embodiment of the circuit primitive that is used in the electronic circuit depicted in FIG. 1. FIG. 4 illustrates a further alternative embodiment of the circuit primitive that is used in the electronic circuit depicted in FIG. 1.

Prior to discussing the electronic circuit implementing a PUF for generating non-linear responses produced by the physics of the FETs of the duplicate circuit primitives at the nanometer scale, a discussion of "strong" and "weak" PUFs is deemed appropriate.

Multiple realizations of PUFs have been proposed. The key distinction that defines PUF constructions is based on the rate at which the number of Challenge-Response Pairs (CRPs) grows with the size of the physical realization of the PUF itself. Two major categories of PUFs in this regard are the Weak PUFs and Strong PUFs. Weak PUFs are PUFs that are characterized by a small number of CRPs. Strong PUFs are systems with a large number of CRPs, which typically grow exponentially with the size of the PUF. The exponential size of the CRP set makes it impossible to record the responses for a PUF of a reasonable size or even to measure all the CRPs within a finite amount of time.

Strong PUFs are essential for public authentication security protocols in which the number of CRPs needs to be large such that the same CRPs are not re-used for authentication (preventing the adversary of simply capturing the CRPs transmitted in plain text and using them for subsequent attacks). However, for a strong PUF to be an effective security primitive, the CRPs need to be un-predictable: given a certain set of known CRPs, it should not be possible to predict the unobserved CRPs with any reasonable probability. If that is not the case, an adversary can stage an attack based on building a model of the PUF.

In weak PUFs, the number of CRPs grows linearly with the PUF physical size. Therefore, an important implicit feature of weak PUFs is that each CRP depends on a single realization of a random variable (property) which is not shared. That makes it impossible to build a model of this PUF and makes weak PUFs resilient to model-building attacks.

The principles of the present invention described herein relate to a strong PUF that is based on the essential non-linearity of responses produced by the physics of the FETs at the nanometer scale as discussed below.

Referring to FIG. 1, FIG. 1 illustrates an electronic circuit 100 implementing a PUF for generating non-linear responses produced by the physics of the FETs of the duplicate circuit primitives at the nanometer scale in accordance with an embodiment of the present invention. Circuit 100 generates an output binary response by comparing the output response, $V_{out1}$ and $V_{out2}$, of the duplicate circuit primitives 101A, 101B, respectively, using a comparator 102. Both circuit primitives 101A, 101B are operated with the same challenge input (identified as $C_0$, $C_1$ and $C_2$ in FIG. 1). Circuit primitives 101A, 101B may collectively or individually be referred to as circuit primitives 101 or circuit primitive 101, respectively. While each circuit primitive 101 contains duplicate circuitry, circuit primitives 101A, 101B may generate a different output voltage due to a particular set of transistors operating in the sub-threshold region whose gates are tied to ground and whose sub-threshold leakage current, the magnitude of which is random based on the threshold voltage variation of the set of transistors, is used to affect the value of the output voltage as discussed further below.

The voltage difference ($\Delta V$) between the two output voltages ($V_{out1}$ and $V_{out2}$) of circuit primitives 101A, 101B depends on the values of the bits of the challenge input and the realizations of the random threshold voltages. For the ideal comparator, the produced binary output of comparator 102 will match perfectly the sign of $\Delta V$ for any magnitude of the voltage difference. The real comparators are analog circuits and are characterized by the non-ideality, known as the offset voltage. That effectively determines the resolution of comparator 102. It is noted that one of ordinary skill in the art would know how to build a comparator in such a way that its offset voltage is sufficiently small so that it does not detrimentally impact the security properties of the PUF of the present invention.

While FIG. 1 illustrates two circuit primitives 101, electronic circuit 100 may include any number of circuit primitives 101 operating on any number of bits of a challenge input. FIG. 1 is not to be limited in scope to the depicted number of circuit primitives 101 and number of bits of the challenge input.

Embodiments of circuit primitives 101A, 101B are discussed below in connection with FIGS. 2-4.

FIG. 2 illustrates an embodiment of the present invention of circuit primitive 101 (FIG. 1) used in circuit 100 (FIG. 1). Referring to FIG. 2, in conjunction with FIG. 1, circuit primitive 101 includes an n-type transistor 201 with its drain coupled to Vdd (the voltage level of the power source). The gate of transistor 201 is coupled to ground. The source of transistor 201 is coupled to the output voltage node (e.g., $V_{out1}$ for circuit primitive 101A) and to the drains of n-type transistors 202A-202N, where N is a positive integer, that operate in the sub-threshold region with their gate voltages tied to ground. In one embodiment, N is equal to the number of bits of the challenge input as shown in FIG. 1. For example, if there are three bits in the challenge input (e.g., $C_0$, $C_1$ and $C_2$), then N is equal to three. N-type transistors 202A-202N may collectively or individually be referred to as n-type transistors 202 or n-type transistor 202, respectively. The drains of transistors 202 are coupled to the output voltage node (e.g., $V_{out1}$ for circuit primitive 101A). The sources of n-type transistors 202 are coupled to n-type transistors 203A-203N, 204A-204N, where N is a positive integer, which act as switch transistors (explained in further detail below). Transistors 203A-203N may collectively or individually be referred to as n-type transistors 203 or n-type transistor 203, respectively. Transistors 204A-204N may collectively or individually be referred to as n-type transistors 204 or n-type transistor 204, respectively. The drains of n-type transistors 203 are coupled to the sources of n-type transistors 202. The drains of n-type transistors 204 are coupled to the sources of n-type transistors 202 and their sources are coupled to the output node (e.g., $V_{out1}$ for circuit primitive 101A). The gates of transistors 203 receive a challenge input (e.g., $C_0, C_1, C_2 \ldots C_N$). Furthermore, the gates of transistors 204 receive the complement of the challenge input (e.g., $C_0', C_1', C_2' \ldots, C_N'$).

As illustrated in FIG. 2, circuit primitive 101 is based on a parallel combination of currents flowing through transistors 202. As discussed above, transistors 202 operate in the sub-threshold region (region where the transistor is being operated below the threshold voltage, such as when the gate-to-source voltage is less than the transistor threshold voltage) with the gate voltages at ground. When transistors 202 operate in the sub-threshold region, current, referred to as the sub-threshold current, flows between the source and drain of the transistor even when the transistor is nominally off/deactivated (transistors 202 are said to be deactivated when their gate voltages are tied to ground). Transistor 201 acts as a load device and also operates in the sub-threshold region (its gate voltage (Vg)=0 as well). Specifically, to ensure that circuit primitive 101 correctly operates, careful sizing of transistors 202, 203 and 204 is needed. For example, to ensure that only transistors 202 exhibit stochastic threshold voltage variation (i.e., to ensure that only transistors 202 exhibit randomness), they are made at a minimum size (e.g., width (W)=Wmin and length (L)=Lmin) in order to maximize their threshold voltage variability. The switch transistors 203, 204 additionally need to provide negligible resistance in the on-state (i.e., when they are activated) but essentially eliminate the sub-threshold leakage current through the given branch when they are in the off-state (i.e., when they are deactivated). That can be achieved by making the channel length much longer than that of transistors 202 since the sub-threshold current is exponentially dependent on the channel length. In one embodiment, the length of switch transistors 203, 204 is approximately at least between 2-50 times the length of transistors 202 such that their sub-threshold leakage current is practically zero, in comparison to that of transistors 202, during the off-state. Furthermore, in one embodiment, the width of transistor 201 is at least between 10-1,000 times the width of transistors 202. Depending on the value of the challenge input bit (e.g., 0 or logical value of 1), the current whose magnitude is random either flows through a branch or is zero. For example, when the value of challenge input $C_0$ is 0, then transistor 203A is deactivated and transistor 204A is activated and the current through this specific branch is effectively eliminated altogether and it does not contribute to the value of the output voltage at the output node (e.g., $V_{out1}$ for circuit primitive 101A). If, however, the value of challenge input $C_0$ is 1, then transistor 203A is activated and transistor 204A is deactivated, and current flows to ground. The current that flows is attributed to the sub-threshold leakage current from transistor 202A operating in the sub-threshold region. The amount of such a current is variable. Based on the values of the bits of the challenge input, zero or more transistors 204 will be activated allowing sub-threshold leakage current from transistors 202 to flow in their branch(es) operating in the sub-threshold region to contribute to the voltage value at the output node (e.g., $V_{out1}$ for circuit primitive 101A). The voltage at the output node (e.g., $V_{out1}$ for circuit primitive 101A) is determined by the entire set of currents that flow through all the branches and is determined by the challenge input as well as the random realizations of the threshold voltages.

A duplicate circuit primitive 101 as the one shown in FIG. 2 is provided to generate a voltage value at the other output node (e.g., $V_{out2}$), such as the output node of circuit primitive 101B shown in FIG. 1. Due to the randomness of the threshold voltage of transistors 202, the amount of current that is generated by circuit primitives 101A, 101B (and the voltage value at its output node) will vary even though the circuit primitives 101 have the same circuitry with the same input value (challenge). As a result, comparator 102 compares the two different voltage outputs and generates a random binary output. Device 100 has 2^N possible output values.

Another embodiment of circuit primitive 101 is provided below in connection with FIG. 3. FIG. 3 illustrates an alternative embodiment of the present invention of circuit primitive 101 (FIG. 1) used in circuit 100 (FIG. 1). Referring to FIG. 3, in conjunction with FIG. 1, circuit primitive 101 includes an n-type transistor 301 with its drain coupled to Vdd (the voltage level of the power source). The gate of transistor 301 is coupled to ground. The source of transistor 301 is coupled to the output voltage node (e.g., $V_{out1}$ for circuit primitive 101A) and to the drain of the first n-type transistor 302A in a series of connected n-type transistors 302A-302C that operate in the sub-threshold region with their gate voltages tied to ground. N-type transistors 302A-302C may collectively or individually be referred to as n-type transistors 302 or n-type transistor 302, respectively. In one embodiment, the number of n-type transistors 302 is equal to the number of bits of the challenge input as shown in FIG. 1. For example, if there are three bits in the challenge input (e.g., $C_0$, $C_1$ and $C_2$), then there will be three n-type transistors 302. Hence, while FIG. 3 illustrates three n-type transistors 302, circuit primitive 101 of FIG. 3 may include any number of n-type transistors 302 that equals the number of bits in the challenge input.

The sources of all the series connected n-type transistors 302A-302B except the last n-type transistor 302C in the series connected n-type transistors 302 are connected to the drains of the following n-type transistors 302B-302C, respectively, in the series connected n-type transistors 302. The source of the last n-type transistor 302C in the series connected n-type transistors 302 is connected to ground.

The drain of the first n-type transistor 302A in the series connected n-type transistors 302 is coupled to the output voltage node $V_{out1}$.

Circuit primitive 101 of FIG. 3 further includes a series connected n-type switch transistors 303A-303C that are in parallel to n-type transistors 302. N-type transistors 303A-303C may collectively or individually be referred to as n-type transistors 303 or n-type transistor 303, respectively. In one embodiment, the number of n-type transistors 303 is equal to the number of bits in the challenge input as shown in FIG. 1. For example, if there are three bits in the challenge input (e.g., $C_0$, $C_1$ and $C_2$), then there will be three n-type transistors 303. Hence, while FIG. 3 illustrates three n-type transistors 303, circuit primitive 101 of FIG. 3 may include any number of n-type transistors 303 that equals the number of bits in the challenge input.

The sources of all the series connected n-type transistors 303A-303B except the last n-type transistor 303C in the series connected n-type transistors 303 are connected to the drains of the following n-type transistors 303B-303C, respectively, and to the drains of n-type transistors 302B-302C, respectively, in the series connected n-type transistors 302, 303. The source of the last n-type transistor 303C in the series connected n-type transistors 303 is connected to ground.

The drain of the first n-type transistor 303A in the series connected n-type transistors 303 is coupled to the output voltage node $V_{out1}$.

The gates of n-type transistors 303 receive the values of the challenge input (e.g., $C_0$, $C_1$ and $C_2$) as shown in FIG. 3.

As illustrated in FIG. 3, circuit primitive 101 is based on a series combination of transistors 302. As discussed above, transistors 302 operate in the sub-threshold region (region where the transistor is being operated below the threshold voltage, such as when the gate-to-supply voltage is less than the transistor threshold voltage) with the gate voltages at ground. When transistors 302 operate in the sub-threshold region, current, referred to as the sub-threshold leakage current, flows between the source and drain of the transistor even when the transistor is nominally off/deactivated (transistors 302 are said to be deactivated when the gate voltages are tied to ground). Transistor 301 acts as a load device and also operates in the sub-threshold region (its Vg=0 as well). To ensure the correct operation of circuit primitive 101, careful sizing of transistors 302, 303 is needed. Specifically, to ensure that only transistors 302 exhibit stochastic threshold voltage variation (i.e., to ensure that only transistors 302 exhibit randomness), they are made at a minimum size (e.g., width (W)=Wmin and length (L)=Lmin) in order to maximize their threshold voltage variability. The role of switch transistors 303 is to set the voltage between the drain and source of transistor 303, and by extension of transistor 302, in the sub-threshold regions to zero. At the same time, when switch transistor 303 is deactivated, its sub-threshold current needs to be negligible compared to the sub-threshold leakage current of the corresponding transistor 302 in parallel with transistor 303. As a result, in one embodiment, the length of transistors 303 is approximately at least between 2-50 times the length of transistors 302 such that their sub-threshold leakage current is practically zero compared to the current of transistors 302 during the off-state of transistors 303. Furthermore, in one embodiment, the width of transistor 301 is at least between 10-1,000 times the width of transistors 302.

Depending on the value of the challenge input bit (e.g., 0 or logical value of 1), transistor 302, whose threshold voltage is random, either is part of the pull-down network or is effectively "removed" in that its contribution to the branch current is eliminated. For example, when the value of challenge input $C_0$ is 0, then transistor 303A is deactivated and the sub-threshold leakage current of the corresponding transistor 302A in parallel with transistor 303A flows thereby affecting the voltage value of the output node $V_{out1}$. The amount of the sub-threshold leakage current is variable due to the randomness of the threshold voltage of transistors 302. If, however, the value of challenge input $C_0$ is 1, then transistor 303A is activated, and current flows through transistor 303A to the next series connected transistors 302B, 303B. Based on the values of the challenge input bits, zero or more transistors 303 will be deactivated allowing sub-threshold leakage current from transistors 302 to flow in their branch(es) operating in the sub-threshold region to contribute to the voltage value at the output node $V_{out1}$.

A duplicate circuit primitive 101 as the one shown in FIG. 3 is provided to generate a voltage value at the other output node, e.g., $V_{out2}$, such as the output node for circuit primitive 101B shown in FIG. 1. Due to the randomness of the threshold voltage of transistors 302, the amount of current that is generated by circuit primitives 101A, 101B (and the voltage value at its output node) will vary even though the circuit primitives 101 have the same circuitry with the same input value (challenge). As a result, comparator 102 compares the two different voltage outputs and generates a random binary output.

Another embodiment of circuit primitive 101 is provided below in connection with FIG. 4. FIG. 4 illustrates a further alternative embodiment of the present invention of circuit primitive 101 that is used in circuit 100 depicted in FIG. 1.

Referring to FIG. 4, circuit primitives 101 shown in FIGS. 2 and 3 are special cases of circuit primitive 101 shown in FIG. 4. One of the differences between circuit primitive 101 of FIG. 4 and circuit primitive 101 of FIG. 3 is that circuit primitive 101 of FIG. 4 includes a footer transistor 407, 408 (discussed further below) that is controlled by an input that corresponds to the NAND logical operation of the values of the challenge input bits.

As illustrated in FIG. 4, circuit primitive 101 of FIG. 4 is an array composed of K columns and N rows of a unit cell, where K and N are positive integer numbers. The unit cell consists of a stochastic sub-threshold n-type transistor. A transistor is referred to as a stochastic transistor if it exhibits strong variability in response to randomness of its threshold voltage. This is achieved by sizing the transistor appropriately. The general dependence is that smaller transistors exhibit more variability. A non-stochastic switch transistor is arranged in parallel to the stochastic transistor. A transistor is referred to as a non-stochastic transistor if it does not exhibit strong variability in response to randomness of its threshold voltage. This is achieved by sizing the transistor to be significantly larger than the minimum-sized transistor. When K is equal to 1, then circuit primitive 101 of FIG. 4 will resemble circuit primitive 101 of FIG. 3 though in the preferred embodiment of the invention for K=1, the footer transistors 407 (408 and on) will be omitted. When N is equal to 1, then circuit primitive 101 of FIG. 4 will resemble circuit primitive 101 of FIG. 2.

As illustrated in FIG. 4, circuit primitive 101 of FIG. 4 is an array composed of K columns and N rows of a unit cell, where K and N are positive integer numbers. The unit cell consists of a stochastic sub-threshold n-type transistor. A non-stochastic switch transistor is arranged in parallel to the stochastic transistor. When K is equal to 1, then circuit primitive 101 of FIG. 4 will resemble circuit primitive 101 of FIG. 3. When N is equal to 1, then circuit primitive 101 of FIG. 4 will resemble circuit primitive 101 of FIG. 2.

As further illustrated in FIG. 4, circuit primitive 101 of FIG. 4 includes an n-type transistor 401 that is functionally similar to n-type transistor 301 of FIG. 3. Furthermore, circuit primitive 101 includes parallel circuit blocks 404A-404K, where K is a positive integer number, with the circuitry that is functionally similar to the circuitry of transistors 302, 303 of circuit primitive 101 of FIG. 3 with the additional footer transistors 407, 408. Circuit blocks 404A-404K may collectively or individually be referred to as circuit blocks 404 or circuit block 404. While FIG. 4 illustrates two circuit blocks 404, circuit primitive 101 may include any number of circuit blocks 404.

Circuit block 404A includes a series connected n-type transistors 402A-402N, where N is a positive integer number, that are functionally similar to the series connected n-type transistors 302 of circuit primitive 101 of FIG. 3. Furthermore, circuit block 404A includes a series connected n-type transistors 403A-403N, where N is a positive integer number, that are functionally similar to the series connected n-type transistors 303 of circuit primitive 101 of FIG. 3. N-type transistors 402A-402N may collectively or individually be referred to as n-type transistors 402 or n-type transistor 402, respectively. N-type transistors 403A-403N may collectively or individually be referred to as n-type transistors 403 or n-type transistor 403, respectively. N-type transistors 402 are in parallel with n-type transistors 403. In one embodiment, the number of n-type transistors 402, 403 corresponds to the number of bits in the challenge input. In one embodiment, the number of n-type transistors 402, 403 does not correspond to the number of bits in the challenge input. In one embodiment, n-type transistors 402 are configured similarly as n-type transistors 302 of FIG. 3 and will not be discussed in further detail herein for sake of brevity. Furthermore, in one embodiment, n-type transistors 403 are configured similarly as n-type transistors 303 of FIG. 3 and will not be discussed in further detail herein for sake of brevity. In one embodiment, the body terminal of stochastic transistors 402 is tied to an internal node of the array as opposed to being tied to ground as shown in FIG. 4.

Circuit block 404A additionally includes a footer transistor 407 that is coupled to the sources of n-type transistors 402N, 403N. The input of footer transistor 407 is controlled by an input that corresponds to the NAND logical operation of the values of the challenge input bits ($C_{11}C_{12} \ldots C_{1N}$, where the first number in the subscript of the challenge input represents the column and the second number in the subscript of the challenge input represents the row). By having footer transistor 407, the node at footer transistor 407 is prevented from being shorted to ground. For example, if all the challenge input bits have the logical value of "1," then the input of footer transistor 407 corresponds to zero thereby preventing the node of footer transistor 407 from being shorted to ground.

As discussed above, circuit primitive 101 of FIG. 4 includes K columns or K circuit blocks configured similarly as circuit block 404A. For example, series connected n-type transistors 405A-405N of circuit block 404K, where N is a positive integer number, are functionally similar to the series connected n-type transistors 402 of circuit block 404A. Furthermore, series connected n-type transistors 406A-406N of circuit block 404K, where N is a positive integer number, are functionally similar to the series connected n-type transistors 403 of circuit block 404A. N-type transistors 405A-405N may collectively or individually be referred to as n-type transistors 405 or n-type transistor 405, respectively. N-type transistors 406A-406N may collectively or individually be referred to as n-type transistors 406 or n-type transistor 406, respectively. N-type transistors 405 are in parallel with n-type transistors 406. In one embodiment, the number of n-type transistors 405, 406 corresponds to the number of bits in the challenge input. In one embodiment, the number of n-type transistors 405, 406 does not correspond to the number of bits in the challenge input. Circuit block 404K additionally includes a footer transistor 408 that is functionally similar to footer transistor 407 of circuit block 404A.

In circuit primitive 101 of FIG. 4, based on the values of the challenge input bits, zero or more transistors 403, 406 will be deactivated allowing sub-threshold leakage current from transistors 402, 405 to flow in their branch(es) operating in the sub-threshold region to contribute to the voltage value at the output node $V_{out1}$. The randomness of the voltage value produced at the output node originates in the randomness of the threshold voltage of transistors 402, 405. While the foregoing only discusses the functionality of blocks 404A and 404K, each block 404 of circuit primitive 101 (has a total of K blocks 404) performs functionally the same.

A duplicate circuit primitive 101 as the one shown in FIG. 4 is provided to generate a voltage value at the other output node (e.g., $V_{out2}$), such as the output node for circuit primitive 101B shown in FIG. 1. Due to the randomness of the threshold voltage of transistors 402, 405, the amount of current that is generated by circuit primitives 101A, 101B (and the voltage value at its output node) will vary even though the circuit primitives 101 have the same circuitry with the same conditional input values. As a result, comparator 102 compares the two different voltage outputs and generates a random binary output.

As a result of the foregoing, circuit 100 (FIG. 1) is less vulnerable to machine-learning attacks by relying on the non-linearity of the responses produced by the physics of the FETs at the nanometer scale. Non-linearity is based on the fact that in the sub-threshold region of FET operation, current is an exponential function of threshold voltages which exhibit strong random intrinsic variability. Also, the Drain-Induced Barrier Lowering (DIBL) effect is used to inject strong non-linearity into the response of circuit 100. This additional non-linearity is due to exponential dependence of current on drain-to-source voltage due to DIBL. The generated voltages from the duplicate circuit primitives 101 of circuit 100 implementing a PUF are compared to produce a random binary response.

It is noted that one of ordinary skill in the art would recognize that circuit 100 and circuit primitives 101 of FIGS. 1-4 may be configured with different circuitry providing the same functionality as discussed above. For example, n-type logic, e.g., n-type transistors, may be replaced with p-type logic, e.g., p-type transistors.

While this disclosure mentioned non-linearity in sub-threshold channel current, other mechanisms of strong non-linearity in terminal current-voltage relationships of solid-state field-effect transistors can be used. Those include non-linearities due to gate insulator (e.g., oxide) tunneling current, gate-induced drain leakage, body effect, and other non-linearities well-known to one of ordinary skill in the art.

It is also noted that the present invention fundamentally exploits the functional behavior of solid-state devices in which terminal current-voltage relationships exhibit strong non-linearity. Therefore, alternative solid-state devices can be used as direct substitutes for the silicon FETs used to illustrate the present invention. Alternative solid-state devices include non-silicon field-effect t ransistors (those using III-V semiconductor materials or carbon nanotubes), bipolar junction transistors, tunneling field-effect transistors and others.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An electronic circuit for implementing a Physically Unclonable Function (PUF), the electronic circuit comprising:
   a first and a second circuit primitive configured to generate a first and a second output voltage, respectively, wherein said first and second circuit primitives are duplicates of one another;
   a challenge inputted to said first and second circuit primitives; and
   a comparator coupled to said first and second circuit primitives, wherein said comparator generates an output based on a difference between said first and second output voltages;
   wherein each of said first and second circuit primitives comprises:
      one or more circuit blocks, wherein each of said one or more circuit blocks comprises:
         a first plurality of series-connected transistors that operate in a sub-threshold region, wherein a gate of each of said first plurality of series-connected transistors is tied to ground or to an internal node, wherein a drain of a first transistor of said first plurality of series-connected transistors is coupled to an output node; and
         a second plurality of transistors that are in parallel to said first plurality of series-connected transistors, wherein a drain of a first transistor of said second plurality of transistors is coupled to said output node, wherein a gate of each of said second plurality of transistors receives a value of one bit of said challenge;
      a first transistor coupled to a source of a second transistor of said first plurality of series-connected transistors and coupled to a source of a second transistor of said second plurality of transistors in response to having two or more of said circuit blocks, wherein said first transistor is controlled by an input that corresponds to a logical operation of each value for each bit of said challenge;
   wherein each of said first and second output voltages of said first and second circuit primitives, respectively, is determined based on current that flows through said first plurality of series-connected transistors of said first and second circuit primitives, respectively, whose magnitude is random based on a threshold voltage variation of said first plurality of series-connected transistors.

2. The electronic circuit as recited in claim 1, wherein each of said first and second circuit primitives further comprises:
   a second transistor functioning as a load device that operates in said sub-threshold region, wherein said second transistor has its gate tied to said ground, wherein a source of said second transistor is coupled to said output node.

3. The electronic circuit as recited in claim 2, wherein said load device has a width between 10-1,000 times greater than a width of each of said first plurality of series-connected transistors.

4. The electronic circuit as recited in claim 1, wherein a number of said plurality of series-connected transistors corresponds to a number of bits of said challenge.

5. The electronic circuit as recited in claim 1, wherein a number of said second plurality of transistors corresponds to a number of bits of said challenge.

6. The electronic circuit as recited in claim 1, wherein a length of each of said second plurality of transistors is at least 2-50 times greater than a length of each of said first plurality of series-connected transistors.

7. The electronic circuit as recited in claim 1, wherein a number of said plurality of series-connected transistors does not corresponds to a number of bits of said challenge.

8. The electronic circuit as recited in claim 1, wherein a number of said plurality of series-connected transistors does not correspond to a number of bits of said challenge.

9. The electronic circuit as recited in claim 1, wherein a number of said second plurality of transistors does not correspond to a number of bits of said challenge.

* * * * *